US009186764B2

(12) United States Patent
Hagspiel

(10) Patent No.: US 9,186,764 B2
(45) Date of Patent: Nov. 17, 2015

(54) DEVICE FOR CORRECTING THE POSITION OF ELEMENTS OF A MACHINE TOOL AND COMPENSATION ELEMENT THEREFOR

(75) Inventor: Walter Hagspiel, Goldach (CH)

(73) Assignee: Starrag AG, Rorschacherberg (CH)

( * ) Notice: Subject to any disclaimer, the term of this patent is extended or adjusted under 35 U.S.C. 154(b) by 274 days.

(21) Appl. No.: 13/884,191

(22) PCT Filed: Nov. 5, 2011

(86) PCT No.: PCT/EP2011/005579
§ 371 (c)(1),
(2), (4) Date: Jul. 10, 2013

(87) PCT Pub. No.: WO2012/062438
PCT Pub. Date: May 18, 2012

(65) Prior Publication Data
US 2013/0302104 A1    Nov. 14, 2013

(30) Foreign Application Priority Data

Nov. 8, 2010   (DE) ..................... 20 2010 008 979 U

(51) Int. Cl.
*B23Q 15/18*     (2006.01)
*B23Q 11/00*     (2006.01)
*B23Q 1/34*      (2006.01)
(Continued)

(52) U.S. Cl.
CPC ............. *B23Q 11/0007* (2013.01); *B23Q 1/34* (2013.01); *B23Q 11/0028* (2013.01); *G05B 19/404* (2013.01); *B23Q 15/18* (2013.01); *B23Q 17/2452* (2013.01); *B23Q 2210/002* (2013.01); *B23Q 2717/006* (2013.01); *Y10T 409/309744* (2015.01)

(58) Field of Classification Search
CPC ............. Y10T 409/309744; Y10T 409/3098; Y10T 408/5614; Y10T 408/5616
USPC ............................... 409/238, 239; 408/89, 90
See application file for complete search history.

(56) References Cited

U.S. PATENT DOCUMENTS 3,276,329 A * 10/1966 Saliba ........................... 409/211
3,484,065 A * 12/1969 Walter .......................... 248/664
4,316,384 A * 2/1982 Pommer et al. .................... 73/76
(Continued)

FOREIGN PATENT DOCUMENTS

DE     1 946 857 A1    9/1970
DE     34 23 495 C2    12/1988
(Continued)

OTHER PUBLICATIONS

Corresponding International Search Report with English Translation dated Jun. 21, 2012 (ten (10) pages).

*Primary Examiner* — Daniel Howell
*Assistant Examiner* — Yasir Diab
(74) *Attorney, Agent, or Firm* — Crowell & Moring LLP

(57) ABSTRACT

A device is provided for correcting the position of at least one element of a machine tool, in particular a milling machine, in which at least one compensating element is disposed between a machine element and an element whose position is to be corrected. The compensating element is adjustable by an actuating distance such that, as a result of the actuation of the compensating element, the element is pivotable about a pivot axis at a joint between the machine element and the element of which the position is to be corrected which ensures the pivoting movement about the pivot axis.

7 Claims, 3 Drawing Sheets

Fig. 1

(51) Int. Cl.
  *G05B 19/404* (2006.01)
  *B23Q 17/24* (2006.01)

(56) References Cited

U.S. PATENT DOCUMENTS

| | | | |
|---|---|---|---|
| 4,775,926 A | 10/1988 | Hasegawa et al. | |
| 4,958,100 A | 9/1990 | Crawley et al. | |
| 6,540,454 B2 * | 4/2003 | Tanaka et al. | 409/131 |
| 6,681,462 B1 | 1/2004 | Frank et al. | |
| 6,998,761 B1 | 2/2006 | Frank et al. | |
| 7,222,424 B2 | 5/2007 | Jovovic et al. | |
| 7,823,632 B2 * | 11/2010 | McAfee et al. | 166/55.7 |
| 2009/0162161 A1 * | 6/2009 | Prust et al. | 409/216 |

FOREIGN PATENT DOCUMENTS

| | | |
|---|---|---|
| DE | 94 22 389 U1 | 6/2001 |
| DE | 10 2004 007 042 A1 | 9/2005 |
| GB | 1 273 050 | 5/1972 |
| JP | 2007-216319 A | 8/2007 |
| WO | WO 99/08330 A1 | 2/1999 |
| WO | WO 03/033933 A1 | 4/2003 |
| WO | WO 03/049897 A1 | 6/2003 |

* cited by examiner

DEVICE FOR CORRECTING THE POSITION OF ELEMENTS OF A MACHINE TOOL AND COMPENSATION ELEMENT THEREFOR

CROSS REFERENCE TO RELATED APPLICATIONS

This application is national phase of PCT International Application No. PCT/EP2011/005579, filed Nov. 5, 2011, which claims priority under 35 U.S.C. §119 from German Patent Application No. 20 2010 008 979.4, filed Nov. 8, 2010, the entire disclosures of which are herein expressly incorporated by reference.

BACKGROUND AND SUMMARY OF THE INVENTION

The invention concerns a device for correcting the position of elements of a machine tool and a compensation element used therefor. In machine tools, in particular with an open frame structure (C-shaped), changes in the inclination between the tool side and the workpiece side arise due to different temperature distributions in the components. In particular for multi-spindle machines with which several identical workpieces are intended to be machined simultaneously, this change in inclination results in different dimensions of the individual workpieces, for example, different thicknesses, depending on the machining spindles and the workpieces. The dimensional differences between the individual workpieces can overshoot the predefined tolerances and lead to defective products.

It is a known practice to limit these changes in inclination by cooling systems and to discharge the heat arising at the main heat sources. However, with any expenditure which can be justified the heat arising can never be completely dissipated by a cooling system.

The basic idea of detecting dislocations in machine tools, said dislocations, for example, being caused by the effects of temperature, and compensating them in a well-regulated manner via pressurized deformation elements, is already known from the German patent publication DE 1 946 857 A, in which a process and a device for monitoring and correcting mechanical shifts, in particular in machine tools, is described. For this, one or more deformation elements are disposed at one or more points in the machine. The deformations of the machine tool are determined by analogy starting from a separate detector-deformation element which can be disposed outside of the machine. Between the deformation element and the detector element means for monitoring and regulation are provided. By extending or contracting the deformation elements dislocations are corrected. This solution is relatively complicated and a decisive disadvantage consists in the fact that the deformation elements are formed in a structurally very unstable manner so that, although highly precise manufacturing requires it, the stability of the machine tool is not ensured.

In the German patent publication DE 10 2004 007 042 A1 there is described a device for correcting the position of components in machine tools with headstocks and traversable longitudinal carriages for compensating dislocations which are caused by changes in temperature or static forces. For this the spindle housing is split below the spindle mounting in the central area of the housing and this separation point is once again closed by an adjustment device (actuator), where the actuator can be actuated by a drive. The separation is preferably done at the cross-sectional transition located at the left on the front side of the housing. At the separated partition the required spreading force is transferred by a mechanically programmable actuator. In order to be able to selectively set the desired inclination correction at the spindle flange the machine-specific temperature behavior is evaluated via the control and thereafter via the programmable actuator the spreading force necessary for the change is applied. In so doing, the actuator is deformed via a threaded spindle with two different pitches to generate the spreading load and thereby the working spindle is inclined. For this the threaded spindle is moved by a drive unit by the required adjustment travel. Serving as drive unit is a positioning drive which comprises a DC motor with an absolute value transmitter, an integrated control and power electronics, and a differential rack gear set in front. This unit is fastened on a motor bearing. Depending on the temperature which is recorded by a sensor the positioning drive, which via the actuator generates the spreading force necessary for changing the inclination of the spindle housing, is controlled via the machine control. Thus the inclination of the spindle is corrected by the required amount. Therein the actuator is not implemented in a very compact manner so that this is disadvantageous for stability. Furthermore, the inclination adjustment of the working spindle is done exclusively as a function of the measured temperature. Any undesirable changes in position which, in given cases, can occur due to other influencing factors, are not detected.

The main problem in the use of the aforesaid solutions is furthermore the loss of rigidity in the degree of freedom in which the compensation acts, as well as in other spatial degrees of freedom. Thus with this device for position correction a type of "floating positioning" with reduced rigidity is realized in every case, whereby the precision of production is negatively affected despite the position or inclination compensation having been carried out.

A device for correcting the dislocation of a translationally movable part, e.g. a carriage, a slide feed, a ram, or the like on a machine tool for cutting metal is known from the German patent publication DE 34 23 495 C2. The machine tool comprises a perpendicular column, a headstock which can be traversed along the column, and the movable part slidingly borne by the headstock and on which a workpiece or an additional device can be fastened.

In this solution the following components are provided:

pressurized with a pressurizing agent, a device for applying a corrective force for correcting the effect caused by the dislocation of the movable part, a position detection device for detecting the position of the movable part, a device for generating a dislocation correction value as a function of the detected position of the movable part, and actuated depending on the dislocation correction value, a valve for setting the pressure of the pressurizing agent, where the device for applying a corrective force comprises a compensation device for correcting an inclination of the movable part and the position detection device generates a position signal, and where the device for generating a dislocation correction value is a calculation device which generates a dislocation correction signal. The valve can be actuated electromagnetically by the dislocation correction signal and the device for applying a corrective force comprises a compensation device for correcting any bending of the movable part, a compensation device for correcting a headstock inclination caused by a shift of the position of the center of mass of the headstock and a compensation device for correcting an elastic deformation of the front lower section of the headstock. A calculation device supplied with the position signal performs an automatic evaluation of the load changes occurring on the movable part and provides for an optimal functional relationship between the movable machine tool part's shifted position represented by the position signal and the dislocation correction values for the individual compensation devices. In this way even for machine tools with large dimensions and heavy weight using relatively simple control means the effect caused by the dislocation of the movable machine tool part is intended to be corrected. This solution is configured in a relatively complicated manner and it is very complicated to compensate the bending of the movable part, here the axially traversable spindle.

It is the object of the invention to provide a simple device for correcting the position of elements of a machine tool, in particular a milling machine, and which ensures a high rigidity of the machine.

In the device according to the invention and for correcting the position of at least one element of a machine tool, in particular a milling machine, between a machine element and the element to be corrected with respect to its position, at least one compensation element is disposed, which can be traversed by an adjustment travel, and by actuating the compensation element by an adjustment travel the element can be pivoted about a pivot axis and where the machine element and the element to be corrected in its position are coupled to one another by a joint ensuring the pivoting movement about the pivot axis.

Due to the fact that the element which can be adjusted in its position is actuated via the compensation element and can be pivoted and stabilized by the joint, the rigidity of the machine is impacted only insignificantly.

If the machine tool in the form of a milling machine is formed with an, in particular open, C-shaped frame structure with a first structural part to which is assigned at least one working spindle with a spindle axis and a tool which can be driven about the spindle axis and with at least one second structural part to which is assigned at least one clamping device for at least one workpiece, then the inclination between the first and second structural part can be changed due to the fact that the first and/or second structural part forms or form or comprises or comprise the element which can be changed in its position and can be changed in their inclination relative to one another by one or more compensation elements through the induced pivoting movement about the pivot axis.

In so doing, the tool or tools disposed on the first structural part are aligned to one another in particular in a tool clamping plane inclined by 90° relative to the spindle axis and the workpiece or workpieces are aligned in a workpiece clamping plane, where the tool clamping plane and the workpiece clamping plane are aligned essentially parallel to one another. If between the tool clamping plane and workpiece clamping plane there is an inclination overshooting a predefined tolerance this inclination is compensated by correcting the inclination of the first structural part or an area of the first structural part and/or correcting the inclination of the second structural part or an area of the second structural part.

Preferably the element which can be adjusted with respect to its inclination is formed as a first part of the second structural part on which the clamping device for the workpiece is located, where a second part of the second structural part forms the machine element and the first part and the second part of the second structural part are pivotably connected to one another by the joint and between the first part and the second part of the second structural part several compensation elements are disposed. Due to the fact that there is pivoting of the machine tool's structural part on which the tool clamp is disposed, an essentially simpler inclination compensation is possible than for an inclination adjustment of the machine element on which the headstock with the entire drive technology for the tools is located.

In connection with this the joint is in an advantageous manner disposed on the second structural part's side facing the first structural part and is formed as a play-free flexure bearing, in particular consisting of sheet metal, and is fastened on the first part and the second part of the second structural part.

On the second structural part's side opposite the joint several compensation elements are disposed next to one another between its first part and second part, where preferably each two compensation elements are used as a pair and at a distance from one another two compensation elements or two pairs of compensation elements are disposed between the first part and the second part of the second structural part and where the separating line between the first part and the second part of the second structural part is aligned essentially horizontally.

A simple and practical possibility for determining the inclination or change in inclination between the two planes consists in the fact that it can be determined with a machine-internal measurement system and that from the value or values determined the magnitude of the adjustment travel of the compensation elements is calculated.

For simultaneously machining in particular structurally identical workpieces which are clamped on the second structural part the first structural part has a corresponding number of working spindles. For machining, for example, two workpieces disposed one over another with two tools disposed one over another, the inclination compensation is of particular importance since for too large an inclination between the workpiece clamping plane and the tool clamping plane the results of machining the workpieces can deviate from one another so undesirably that defective products occur.

The compensation element which is according to the invention and which is used for correcting the position of at least one element of a machine tool, in particular a milling machine, can be traversed by an adjustment travel and is disposed between a machine element and the element to be corrected with respect to its position and comprises an essentially tubular elongated body with a thin wall and a longitudinal axis aligned to the direction of the adjustment travel, where a supporting body is disposed within the elongated body and a pressure chamber is formed between the supporting body and the elongated body in such a manner that with a pressure force changing and acting in the pressure chamber of the elongated body the thin wall of the elongated body is changed in its length in the adjustment direction by the adjustment travel and thereby the element is adjusted in its position/inclination. Due to the disposition of a supporting body in the elongated body along with axial adjustability, high stability and rigidity of the compensation element is ensured and thus with its use the rigidity of the machine tool is impacted only insignificantly which for a good machining result in particular when high precision is required is an essential prerequisite.

Preferably the elongated body and the supporting body are connected to one another at a first end of the compensation element and at the other second end of the compensation element the pressure chamber is formed between the outer contour of the supporting body and the inner contour of the elongated body.

For this the supporting body and the elongated body each have at the second end of the compensation element a base, where between the bases the pressure chamber is formed so that with a force changing and acting in the pressure chamber against both bases the total height of the compensation element changes.

Along with this the force acting in the pressure chamber and generating the adjusting movement can optionally be induced by the pressurization of the pressure chamber, which is sealed by a seal and comprises a pressurizing agent conduit, by pressurizing medium or by a piezoelectric element which is disposed in the pressure chamber and which can be adjusted in its height by application of a voltage or by an element which is disposed in the pressure chamber and can be adjusted in its height mechanically.

With the solution according to the invention an extremely simple and practical solution for adjusting the inclination of a machine element is provided with which the stability of the machine is not impacted or is impacted only insignificantly.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
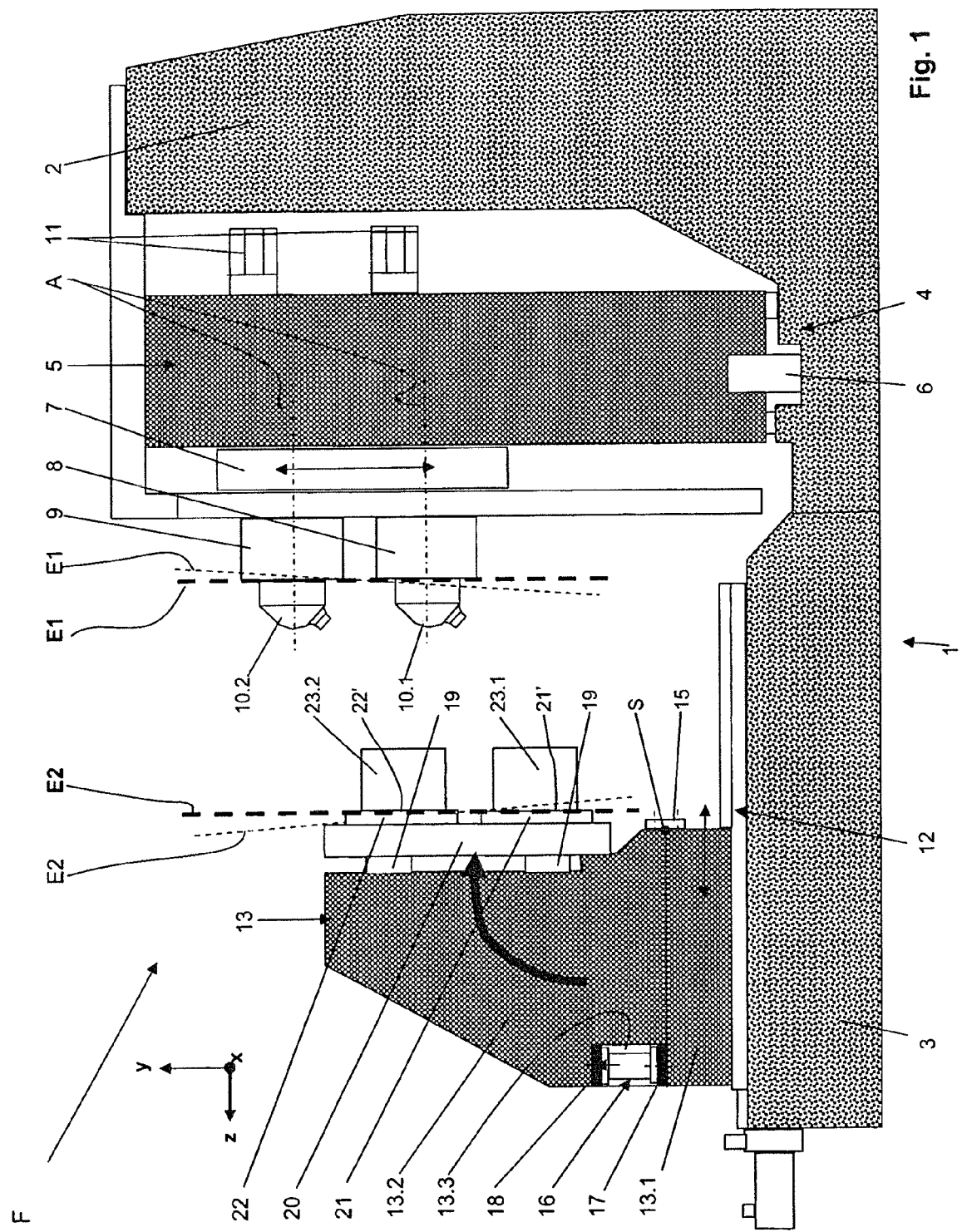
FIG. 1 shows in side view a schematic representation of a two-spindle milling machine for simultaneously machining two workpieces in accordance with an embodiment of the present invention.
Figure 2:
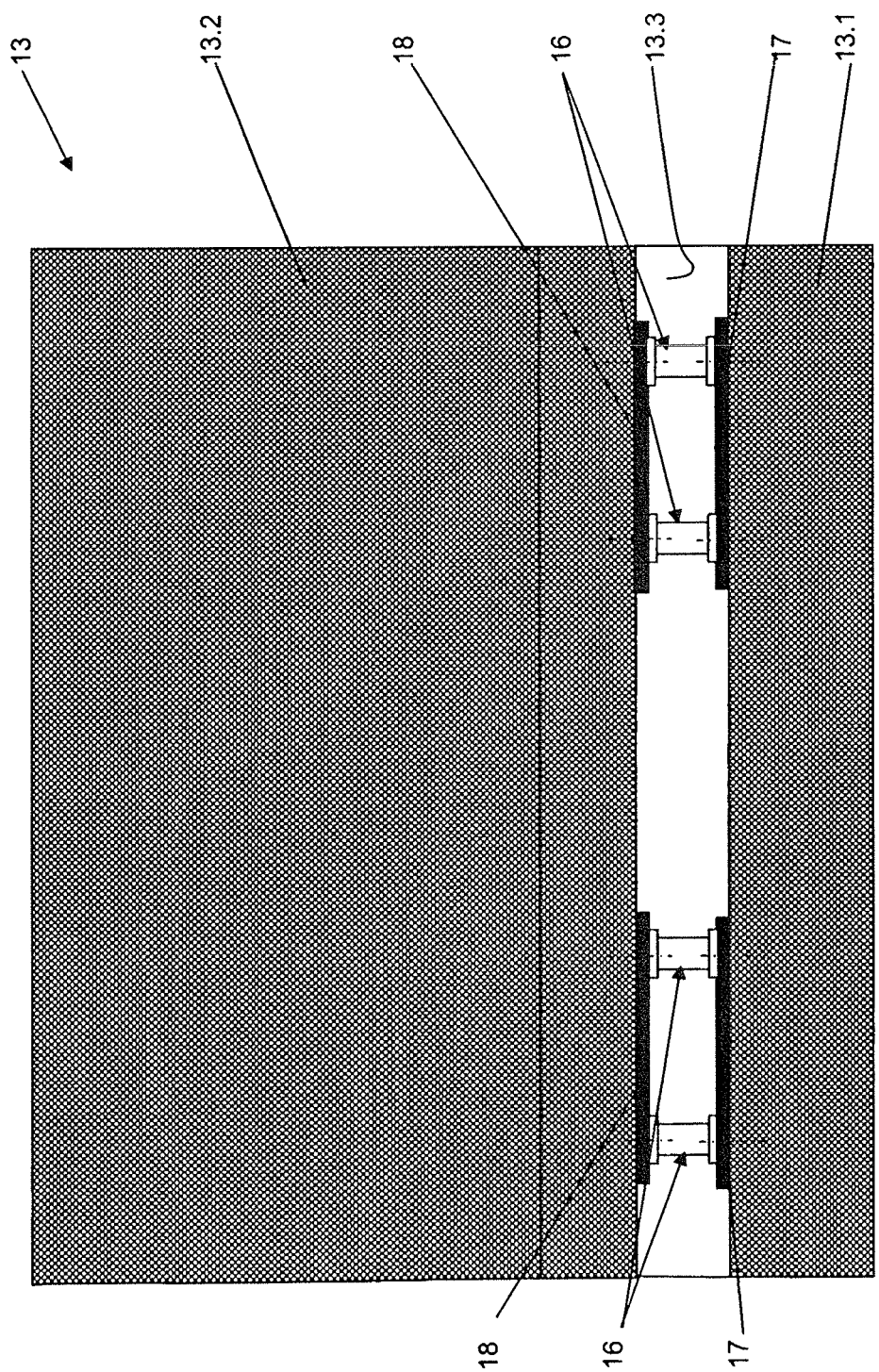
FIG. 2 shows the representation of the rear view of the machine of FIG. 1.

According to FIG. 1 the milling machine F has an essentially C-shaped, upwardly open structure. The machine bed 1 has an X-bed 2 extending essentially vertically and a Z-bed 3 extending essentially horizontally. The X-bed 2 has a guide area 4 abutting the Z-bed 3, on which guide area a vertically extending first structural part 5 in the form of an X-carriage is mounted in such a manner that it can be traversed in the X-direction by a first drive 6. On the X-carriage/first structural part 5 is fastened a headstock 7 which has two work spindles 8, 9 disposed one over another and which can be adjusted in its level in the Y-direction via guides which are not represented. Each work spindle 8, 9 comprises a tool 10 in the form of a milling head and can be driven by a drive 11. The spindle axes A of the two work spindles 8, 9 extend in the Z-direction and are disposed one over the other and aligned to one another. Along with this the tools 10 are aligned so that they lie in a common tool-clamping plane E1 (bold-faced and dotted) which extends vertically in the Y-direction. On the Z-bed 3 a second structural part 13 in the form of a Z-carriage is mounted in such a manner that it can be traversed in the Z-direction by a guide 12, a rear view of said second structural part also being represented in FIG. 2. The second structural part 13 has a horizontal division 14 so that it is divided into a lower first part 13.1 and a second part 13.2 lying above it. The first part 13.1 and the second part 13.2 are connected at their sides facing in the direction of the first structural part 5 via a flexure bearing 15 (not visible in FIG. 2), where the flexure bearing 15 is shaped in the form of a flat sheet. On its side opposite from the flexure bearing the second structural part 13 has between its first part 13.1 and second part 13.2 a total of four compensation elements 16 which are disposed in two pairs all in a row (see also FIG. 2). The compensation elements 16 sit in a recess 13.3 which is in the second part 13.2 and is open in the direction towards the first part 13.1. Each two compensation elements 16 are connected on their lower side via two lower pressure plates 17 to the first part 13.1 and on the upper side via two upper pressure plates 18 to the second part 13.2. On the second structural part 13 (Z-carriage), holding fixtures 19 for fastening a clamping device, here a clamping plate 20, are disposed. By clamping devices 21, 22 disposed in alignment vertically over one another, a first workpiece 23.1 and a second workpiece 23.2 are clamped. The workpiece clamping plane E2 (bold-faced and dotted), which is defined among other things by the vertically extending clamping faces 21' and 22' of the clamping devices 21, 22, should be aligned parallel to the workpiece clamping plane to ensure qualitatively high-value machining. For example, temperature effects can lead to the workpiece toolclamping plane E1 and/or the workpiece clamping plane E2 (as indicated in FIG. 1 by a thin dotted line) being inclined relative to one another, whereby quality requirement-conforming production of workpieces with identical dimensions would no longer be guaranteed. By a measurement system, internal to the machine and not represented, deviations from a theoretical alignment of the machine frame structure are detected. On overshooting predefined theoretical values a signal for triggering an adjusting movement of the compensation elements 16 is issued according to the embodiment example by the control of the machine and the compensation elements 16 are traversed by an adjustment travel. The second part 13.2 of the second structural part 13 thereby is pivoted/inclined about a pivot axis S in the area of the joint 15 so that here the position of the workpiece clamping plane E2 is once again shifted into a theoretical range. Preferably the measurement at the vertically extending clamping faces 21' and 22' of the clamping devices 21, 22 is done by the machine-internal measurement system. It is also possible to carry out a temperature measurement or even to combine different measurement methods with one another and from that to calculate the required adjustment travel of the compensation elements. Depending on the required adjustment the compensation elements execute a raising or lowering movement. In the embodiment example represented in FIG. 1 a raising movement must be executed in order to restore the required bold-faced dotted workpiece clamping plane E2 from an out-of-tolerance inclination of the required thin dotted workpiece clamping plane E2.

If the plane E1 has also changed in its inclination, the adjustable plane E2 is aligned parallel to the plane E1. Simultaneously, by a traverse of the Z-carriage 13 via the CNC control the Z-zero point is once again newly adapted. According to the geometric arrangement of the workpieces and the compensation elements 16 relative to the center of rotation S the Y-position is compensated via the CNC control via the movement of the vertical carriage 7.

Through the use in particular of several compensation elements in combination with at least one flexure bearing a high rigidity of the machine tool is ensured.

In connection with this the flexure bearing or bearings should be formed to be flexible in the degree or degrees of freedom in which the desired compensation movement is intended to occur while in the other 5 degrees of freedom they have a high rigidity. The entire arrangement of the flexure bearings has a high rigidity in all degrees of freedom in which no movements are intended to be executed.

According to an embodiment example not represented it is also possible to subdivide the second structural part 5 analogously to the first structural part and to provide it with a joint and compensation elements so that the tool clamping plane E1 can also be inclined. The dividing plane of the first structural part 5 should then be disposed approximately at the level of the dividing plane of the second structural part 13.

The invention is of importance in particular for simultaneously machining two workpieces with two tools since with the invention it is ensured that the machining of two workpieces is done so that they are produced with essentially equal dimensions in the range of tolerance since the inclination of the workpiece clamping plane to the inclination of the tool clamping plane is constantly monitored and if necessary realigned.

Figure 3:
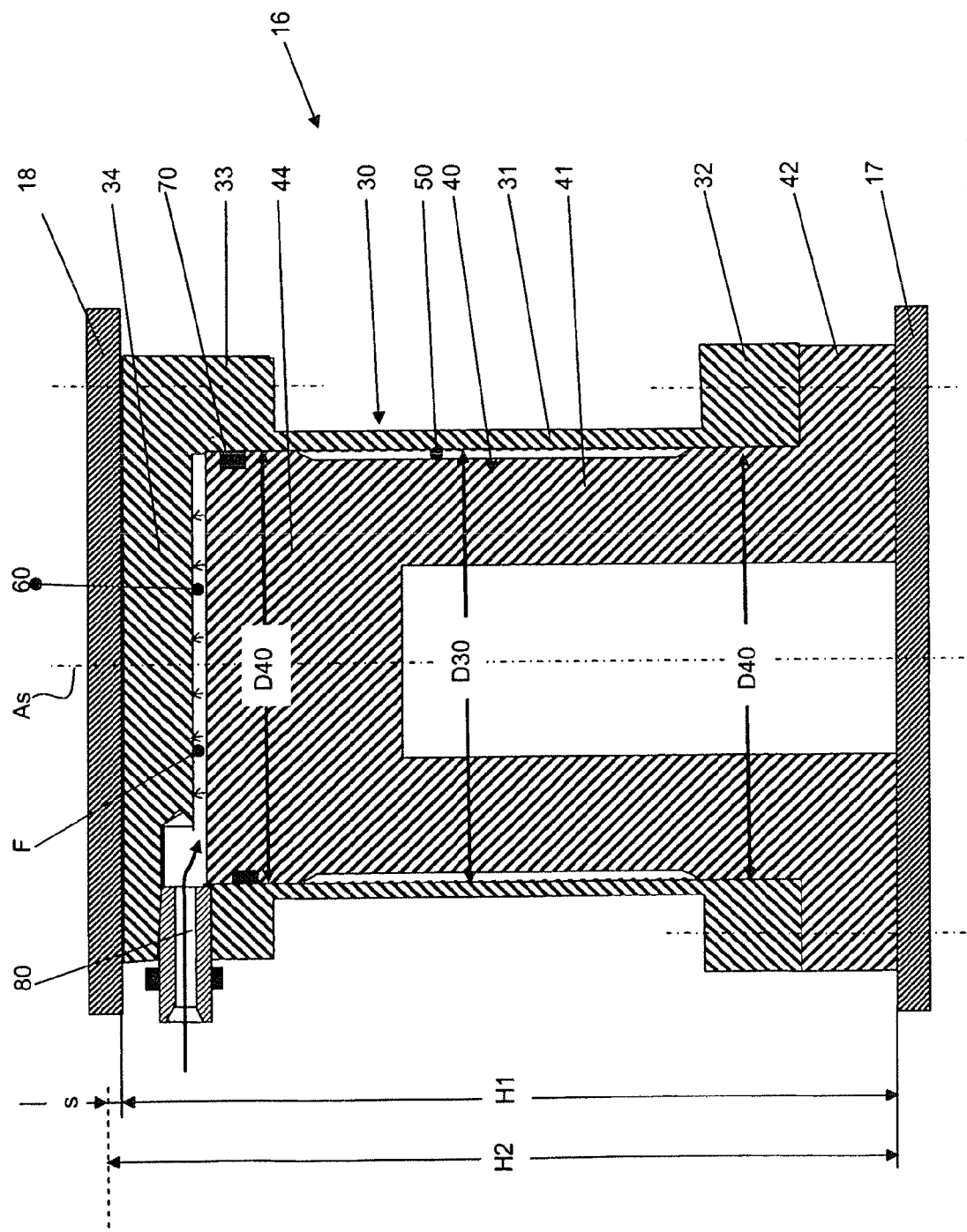
FIG. 3 shows the longitudinal section of the compensation element of the machine of FIG. 1.

In FIG. 3 a variant of the embodiment of a compensation element 16 is represented. It comprises an essentially tubular, hollow, downwardly open elongated body 30 with a thin wall 31 and a longitudinal axis As aligned to the direction of the adjustment travel s. At its end which is lower in the representation the elongated body 30 comprises a flange 32 pointing radially outwards and at its opposite upper end a second flange 33 pointing radially outwards and a base 34 so that the elongated body has an essentially preferably rotationally symmetric bowl-shaped structure. In the elongated body 30 an essentially cylindrical supporting body 40 is disposed which has in relation to the thin wall 31 of the elongated body 30 an in particular thicker and more rigid wall 41 and on its lower side also a flange 42 pointing radially outwards on which the first flange 32 of the elongated body 30 lies. The supporting body 40 also comprises on its side opposite the flange 42 a base 44 and is on the whole also shaped in the form of a bowl.

The outer diameter D40 of the supporting body 40 between its flange 42 and its base 44 and the inner diameter D30 of the elongated body 30 are coordinated with one another. In order to ensure simple mounting and to reduce friction the supporting body 40 has however in its essentially central area a reduction in diameter so that a gap 50 is formed.

The base of the elongated body 34 and the base of the supporting body 44 are at a distance from one another so that a pressure chamber 60 is formed. This is bounded by a seal 70 disposed between the inner diameter D30 of the elongated body 30 and the outer diameter D40 of the supporting body 40 which is disposed in the area of the base 44 of the elongated body. Leading to the pressure chamber 60 is a pressurizing agent conduit 80 which here reaches through the second flange 33 of the elongated body 30. On the lower side of the compensation elements 16 lies a lower pressure plate 17 (or a machine element) and on the upper side an upper pressure plate 18 (or an element to be adjusted).

The first flange 32 of the elongated body 30 and the flange 42 of the supporting body 40 are connected to one another and to the lower pressure plate 17. The second flange 33 of the elongated body 30 is connected to the upper pressure plate 18.

In the starting state the pressure chamber 60 is preferably pressureless and the compensation element has a height H1. To realize an adjustment travel s, pressurizing agent not represented here is conducted via the pressurizing agent conduit 80 into the pressure chamber 60 and in it a pressure is built up which causes rigid body deformation (in the elastic range) of the thin wall 32 of the deformation element 30 under tension and the thin wall 32 is extended, whereby the height of the compensation element is increased by the adjustment travel S to the height H2 and thus due to the force F induced (in the pressure chamber 60) the abutting element, here the upper pressure plate 18, rises, while the machine element, here the lower pressure plate 17, remains fixed relative to the frame.

Through the mutually engaging bowl-shaped components in the form of deformation element 30 and supporting body 40 a very simple and stable structure of a compensation element 16 is provided and has only a negligible effect on the rigidity of the machine. Alternatively, it is also possible (but not represented) to make the supporting body 40 of solid material.

According to an additional embodiment variant the pressure chamber and thus the elongated element can also be pressurized constantly with a pressure in the pressure chamber or a tensile load of the wall of the elongated body (in the manner of a preloading). On reduction of the pressure an adjusting movement (downwards according to FIG. 3) and on increase of the pressure an oppositely directed adjusting movement (upwards according to FIG. 3) is carried out.

According to not represented variants the adjusting movement can also be induced by an element which can be adjusted in its length and which is disposed between the elongated body and the supporting body (preferably in the pressure chamber between their bases). This can, for example, be a piezoelectric element which changes its height on application of a voltage.

The compensation element can along with its use in machine tools, in particular milling machines, also be disposed between any machine elements which are intended to be adjusted with respect to their length.

Through the solution according to the invention the static and dynamic rigidity of the machine structure in all degrees of freedom is reduced to only a very small amount.

The change in inclination is accomplished preferably automatically via the adjustment of a hydraulic pressure in the pressure chamber of the compensation elements.

It is possible to change the inclination continuously and with very high precision (in the μm range), where the adjustment of the pressure and thus the inclination is preferably done via the CNC control of the machine tool (milling machine). For this the change of the inclination of a structural part of the machine is done in particular via automatic measurement cycles with a machine-internal measurement system which are initiated via the CNC control and/or via thermal sensors which are mounted at suitable points of the structure.

From the determined measured values the required compensation is calculated and via the CNC control of the compensation process is triggered and carried out. After the completed compensation of the inclination the result of the Z-traverse and Y-traverse can if needed be measured and checked whether it corresponds to the specifications and expectations.

The invention claimed is:

1. A device for correcting the position of at least one element of a machine tool, comprising:
   a first machine tool element;
   a second machine tool element; and
   at least one compensation element wherein the at least one compensation element is located between the first machine tool element and the second machine tool element, arranged to alter an adjustment travel between the first and second machine tool elements, and arranged to pivot one of the first and second machine tool elements relative to one another about a pivot axis at a joint connecting the first and second machine tool,
   wherein
      the machine tool is a milling machine having an open frame structure, the open frame structure including:
         a first structural part having at least one spindle with a spindle axis and a tool configured to be driven about the spindle axis,
         at least one second structural part having at least one clamping device for at least one workpiece, at least one of the first and second structural parts includes the first machine tool element, the second machine tool element and the at least one compensation element in the respective structural part, and an inclination between the first and second structural parts is adjustable by actuation of the at least one compensation element, the at least one spindle axis is aligned in a tool clamping plane perpendicular to the spindle axis, the at least one clamping device for the at least one workpiece is aligned in a workpiece clamping plane, the tool clamping plane and the workpiece clamping plane are aligned essentially parallel to one another, and adjustment of the inclination the first and second structural parts adjusts an inclination between the tool clamping plane and workpiece clamping plane, the second structural part includes the second machine tool element, the second machine tool element supports the at least one clamping device, the at least one compensation element includes a plurality of compensation elements disposed between the first and second machine tool elements, the joint is disposed on a side of the second structural part facing the first structural part and is a play-free flexure bearing, the plurality of compensation elements are disposed on a side of the second structural part opposite from the joint, and two of the plurality of compensation elements are paired and arranged at a distance from another two of the plurality of compensation elements, the device further comprising a machine-internal measurement system arranged to measure at least one of the inclination and a change in the inclination for use in determining a magnitude of a change in adjustment travel of the plurality of compensation elements required to maintain the inclination between the tool clamping plane and the workpiece clamping plane at a predetermined inclination.

2. The device according to claim 1, wherein a separating line between the first and second machine tool elements is aligned essentially horizontally.

3. The device according to claim 2, wherein the at least one spindle includes a plurality of spindles supported on the first structural part, the at least one clamping device includes a plurality of clamping devices on the second structural part, and the plurality of spindles and the plurality of clamping parts are configured for simultaneous machining of workpieces.

4. The device with a compensation element for correcting the position of at least one element of a machine tool according to claim 1, comprising:

an essentially tubular elongated body having a longitudinal axis aligned in a direction of the adjustment travel;

a supporting body disposed within the elongated body;

a pressure chamber between the supporting body and the elongated body configured such that a change in force generated in the pressure chamber changes a length of the compensation element in the direction of the adjustment travel.

5. The device with a compensation element according to claim 4, wherein at a first end of the compensation element the elongated body and the supporting body are disposed adjacent to one another, and at a second end of the compensation element the pressure chamber is formed at least in part between an outer contour of the supporting body and an inner contour of the elongated body.

6. The device with a compensation element according to claim 5, wherein the pressure chamber is further formed at least in part by opposing surfaces of supporting body and the elongated body arranged perpendicular to the direction of the adjustment travel.

7. The device with a compensation element according to claim 6, wherein the change in force in the pressure chamber is generated by at least one of changing a pressure in a pressure medium in the pressure chamber, the pressure chamber being sealed by a seal and comprising a pressure medium conduit, actuating a piezoelectric element disposed in the pressure chamber, a height of the piezoelectric element being adjustable by application of a voltage, and actuating a mechanical element disposed in the pressure chamber, a height of the mechanical element being adjustable by operation of mechanical element.

* * * * *